(No Model.)
J. BLUM.
DUMPING WAGON.
No. 498,504. Patented May 30, 1893.
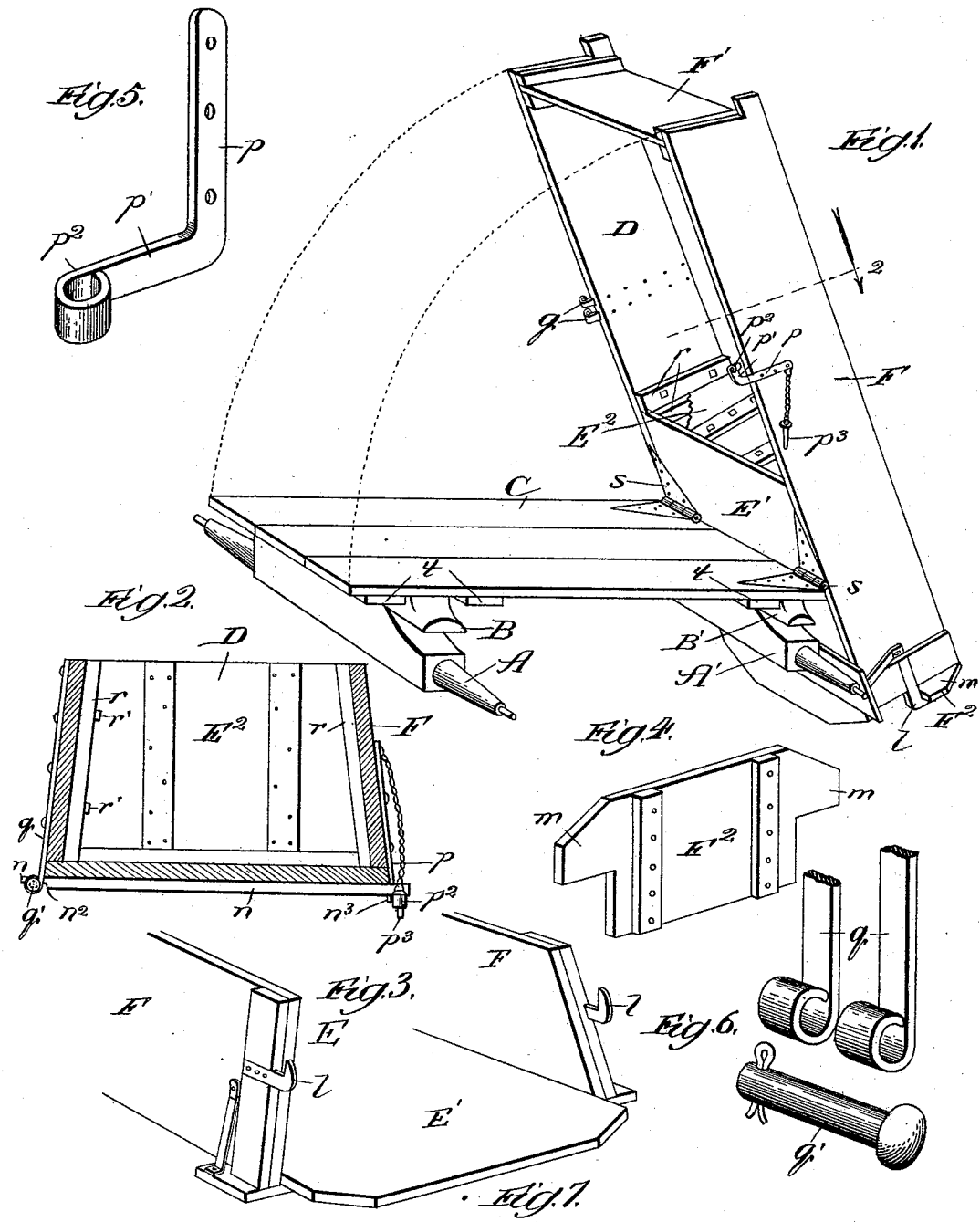
Witnesses:
Inventor:
Joseph Blum,
By Dyrenforth & Dyrenforth
Attys

UNITED STATES PATENT OFFICE.

JOSEPH BLUM, OF CHICAGO, ILLINOIS.

DUMPING-WAGON.

SPECIFICATION forming part of Letters Patent No. 498,504, dated May 30, 1893.

Application filed February 23, 1893. Serial No. 463,362. (No model.)

*To all whom it may concern:*

Be it known that I, JOSEPH BLUM, a citizen of the United States, residing at Chicago, in the county of Cook and State of Illinois, have invented a new and useful Improvement in Dumping-Wagons, of which the following is a specification.

My object is to provide a dumping wagon of improved construction whereby the operation of dumping and freeing the wagon of its load may be particularly easy and quick to accomplish.

Although my improved wagon may be employed for carrying any material which may be loaded thereon, it is more especially intended for use in transporting garbage, ashes and the like.

In the drawings—Figure 1, is a perspective view of my improved dumping wagon with a part broken away and without the wheels, the wagon box being shown upset; Fig. 2, a cross section of the wagon-bed and box, showing the box in its normally closed position, the section being taken on a line corresponding in relative position with line 2 of Fig. 1, and viewed in the direction of the arrow; Fig. 3, a perspective view of the rear end of the wagon with the end-gate removed; Fig. 4, a perspective view of the end-gate; and Figs. 5, 6 and 7, enlarged perspective and broken perspective views of details of the preferred means for fastening the wagon box down when closed.

A A' are, respectively, the front and rear axles of a wagon, and B B' the front and rear bolsters. The usual wheels, reach, tongue-hounds and bolster stake-sockets would be provided, to complete the running gear, but are left out so as not to interfere with the illustration of my improvements.

C is a base or platform preferably strengthened on its under side by cleats $t$, and extending from a point a little in advance of the front bolster to about the rear edge of the rear bolster, and is held against movement by the engagement of the cleats $t$ with the bolsters.

The dumping frame of the wagon, as shown in the drawings, is divided into two compartments, D E. Side boards F extend the full length of the two compartments, and are provided with a preferably fixed front-board or gate F', and removable rear end-gate $F^2$. The side boards F incline inward, as shown, whereby the compartments D E are slightly larger at the base than at the top. The front board F' may also incline, as indicated in Fig. 1. The rear compartment E extends from the end gate $F^2$ to a point somewhat forward of the rear end of the platform C, and the said compartment is provided with a floor E' which overlaps the platform C and is pivotally secured thereto by means of hinges $s$.

Between the compartments D E is a partition $E^2$ held between upright cleats $r$, one of which may be fastened removably in place by bolts $r'$, so that it may be taken out and the partition removed should it ever be desired to throw the compartments D E into one. When the dumping frame is in its normal position the platform C forms the floor of the compartment D.

On one side of the wagon box, and secured to the respective side board, are two downward extending spaced eye-pieces $q$ adapted to receive a bolt or cross-piece $q'$ affording together a socket-frame, and on the opposite side of the wagon box secured to the respective side board, is an angle-iron piece $p$ having a laterally extending part $p'$, which when the dumping frame is in its normal position extends in a horizontal plane. In the free end of the angle iron piece is an eye $p^2$ to receive a pin $p^3$. When it is desired to fasten the frame down in its normal position, the bolt $q'$ is inserted through the eyes of the eye-pieces $q$, and a bar $n$ of a length exceeding slightly the width of the platform C is slipped at its end $n'$ between the eye-pieces $q$ over the bolt $q'$ to extend across the under side of the platform C to the angle-piece $p$, where it is caused to rest upon the part $p'$ and to be held against removal by inserting the pin $p^3$ into the eye $p^2$, all as illustrated in Fig. 2. A shoulder $n^2$ near the end $n'$, and a stud $n^3$ near the opposite end, hold the bar $n$ against displacement by longitudinal movement. The dumping frame being down in its normal position, and secured as described, both compartments may be filled with the material to be transported.

When it is desired to dump the wagon of its contents the pin $p^3$ is removed and the bar $n$ withdrawn from its bearings at $p'$ and $q'$. The frame consisting of the side boards F, ends F' F², floor E' and partition E² is then raised on the hinges $s$, the weight of the contents of the compartment E serving to materially assist the operation. When the frame is raised to the position shown in Fig. 1 the platform C may be swept of its contents, and when this is done the end gate F² may be removed to permit the contents of the compartment E to slide out.

It is usually required, for sanitary reasons, that the wagon boxes of garbage wagons shall be thoroughly cleaned every time that they are emptied. The garbage which is often moist tends to stick to the inner surfaces of the side boards of garbage wagons, but by having the side boards flaring as described the sticking to it of garbage is to a large extent overcome. The flaring shape of the box also prevents binding of the side boards and end against the contents, which might make the raising of the frame on its pivots difficult to accomplish.

When the wagon contents have been dumped and the dumping frame is in the position shown in Fig. 1, it is any easy matter to clean off the platform C, floor E' and the sides of the compartments.

In hauling garbage, ashes, and the like, the partition E² is particularly desirable, for the reason that it divides the contents of one compartment from the other, and permits the dumping to be readily performed, without the necessity of tearing the contents apart. When the wagon is employed for hauling brick or material in barrels the partition E² may be removed by first removing one of the cleats $r$, as before stated. The end gate F² I prefer to employ is shaped as shown in Fig. 4 having the laterally extending shoulders $m$. On the rear ends of the side boards F are rearward extending socket pieces $l$ in which the shoulders $m$ rest when the gate is in place. The gate may be readily removed by simply lifting it at its shoulder $m$ out of the socket pieces $l$.

What I claim as new, and desire to secure by Letters Patent, is—

1. In a dumping-wagon, the combination with the running-gear, of a platform C upon the said running-gear and terminating adjacent to the rear end thereof, and a dumping-frame pivoted at the rear end of said platform, provided with a floor E' extending backward from said platform, and side-boards extending approximately the full length of the platform and floor, substantially as described.

2. In a dumping wagon, the combination with the running-gear, of a platform C resting on the said running-gear and terminating adjacent to the rear end thereof, and a dumping frame pivoted at the rear end of said platform, provided with a floor E' extending backward from said platform and inward inclined side-boards extending approximately the full length of the said platform and floor, substantially as described.

3. In a dumping-wagon, the combination with the running-gear, of a platform C resting on the said running gear and terminating adjacent to the rear end thereof, and a dumping-frame pivoted at the rear end of said platform, comprising a floor E' overlapping the rear end portion of the said platform and extending backward therefrom, side-boards extending approximately the full length of the said platform and floor, and a partition extending between the said side-boards at the forward edge of the said floor, whereby the dumping-frame is divided into two compartments, the platform C affording the floor of one of said compartments when the frame is in its normally closed position, substantially as described.

4. In a dumping-wagon, the combination with the running gear, of a wagon box on said running gear consisting of a platform C, and a dumping frame comprising a floor E', inclined side-boards F secured to the floor E', front board F', rear end-gate F², and partition E², at the forward end of said floor, the dumping frame being pivoted between the ends of the floor E² at the rear end of said platform, substantially as described.

5. In a dumping-wagon, the combination with the running-gear, of a wagon-box on said running gear, consisting of a platform C, and a dumping frame comprising a floor E', side-boards F, front board F', end-gate F² and partition E² at the forward end of said floor, the dumping frame being pivoted between the ends of the floor E² at the rear end of said platform, and means for securing the dumping frame in its closed position, comprising the downward projecting socket frame on one side-board, angle piece $p$ on the opposite side-board and bar $n$ adapted to extend across the under side of said platform and engage at its opposite ends respectively the said socket-frame, and angle piece, substantially as described.

6. In a dumping-wagon, the combination with the running-gear of a platform C thereon and dumping-frame having the floor E' and side-boards F, of a rear end-gate F² for the dumping-frame having laterally extending shoulders $m$ and rearward extending socket-pieces $l$ on the side-boards F, into which the said shoulders are adapted to slide to hold the said end-gate in place, substantially as described.

JOSEPH BLUM.

In presence of—
M. J. FROST,
W. N. WILLIAMS.